United States Patent [19]

Howard

[11] 4,246,379

[45] * Jan. 20, 1981

[54] RADIATION CURABLE COATING COMPOSITIONS

[75] Inventor: Dennis D. Howard, Girard, Pa.

[73] Assignee: Lord Corporation, Erie, Pa.

[ * ] Notice: The portion of the term of this patent subsequent to Sep. 5, 1995, has been disclaimed.

[21] Appl. No.: 901,541

[22] Filed: May 1, 1978

Related U.S. Application Data

[63] Continuation of Ser. No. 710,775, Aug. 2, 1976, abandoned, which is a continuation-in-part of Ser. No. 708,155, Jul. 23, 1976, abandoned.

[51] Int. Cl.³ .................... C08L 75/06; C08L 75/08
[52] U.S. Cl. ................... 525/440; 204/159.15; 525/455; 525/920
[58] Field of Search .............. 260/859 R; 525/455, 525/440, 920

[56] References Cited

U.S. PATENT DOCUMENTS

| | | | |
|---|---|---|---|
| 3,509,234 | 4/1970 | Burlant | 260/859 R |
| 3,531,364 | 9/1970 | Schmidle | 260/859 R |
| 3,641,199 | 2/1972 | Niederhauser | 260/859 R |
| 3,642,943 | 2/1972 | Noel | 260/859 R |
| 3,677,920 | 7/1972 | Kai | 260/859 R |
| 3,678,014 | 7/1972 | Suzuki | 260/859 R |
| 3,718,638 | 3/1973 | Huemmer | 260/859 R |
| 3,772,404 | 11/1973 | Knight | 260/859 R |
| 3,829,531 | 8/1974 | Graff | 260/859 R |
| 3,856,830 | 12/1974 | Kuehn | 260/859 R |
| 3,876,726 | 4/1975 | Kuehn | 260/859 R |
| 3,891,523 | 6/1975 | Hisamatsu | 260/859 R |
| 3,907,751 | 9/1975 | Knight | 260/859 R |
| 3,925,335 | 12/1975 | Kuehn | 260/859 R |
| 3,975,457 | 8/1976 | Chang | 260/859 R |
| 4,034,017 | 7/1977 | Chang | 260/859 R |
| 4,112,017 | 9/1978 | Howard | 260/859 R |

*Primary Examiner*—Paul Lieberman
*Attorney, Agent, or Firm*—John A. Gazewood; James W. Wright

[57] ABSTRACT

Unsaturated addition-polymerizable urethane resins prepared from at least one polyisocyanate, at least one monomeric or polymeric polyol, and at least one unsaturated addition-polymerizable monomeric organic compound characterized by the presence of a single isocyanate-reactive active hydrogen group, wherein said polyol has a hydroxyl functionality of at least 2.1, and the amount of polyisocyanate is sufficient to provide an NCO:OH ratio, with respect to said polyol, of at least 2.1:1, are characterized by reduced viscosity, improved physical stability, and by improved solubility and compatibility in organic solvents/diluents. Particularly advantageous resins are obtained by employing isocyanate-functional prepolymers as precursors for such unsaturated addition-polymerizable urethane resins.

33 Claims, No Drawings

RADIATION CURABLE COATING COMPOSITIONS

This is a continuation of application Ser. No. 710,775, filed Aug. 2, 1976, which is a continuation-in-part of Application Ser. No. 708,155, filed July 23, 1976 both now abandoned.

This invention relates to radiation curable coating and ink compositions. More particularly, this invention relates to unsaturated addition-polymerizable urethane resins and to radiation curable compositions containing such resins.

Increasing concern with energy, environmental protection, and health factors have cooperated to enhance the potential of radiation curable coatings. In principle, such coatings comprise a polymerizable mixture that can be applied as a thin film to a substrate and polymerized at a rapid rate by exposure to a radiation source such as an electron beam, plasma arc, ultra violet light, and the like. Advantages of radiation curable coatings include a practical method of at least reducing air pollution from volatile vapor loss, rapid cure rates at ambient temperatures, reduced operating costs, the use of heat-sensitive substrates, and improved product performance.

Among the more notable achievements in the field of radiation curing has been the development of the so-called 100 percent reactive solids systems based on unsaturated addition-polymerizable urethane resin. A characteristic feature of such systems is the substantial absence of conventional inert volatile solvents. Instead, the systems contain reactive diluents which react during curing to become an integral part of the cured coating. Such systems have been widely accepted commercially. While such systems provide high-performance coatings which can be cured at high line speeds, they have also provided a new set of problems for the coatings formulators.

While unsaturated addition-polymerizable urethane resins can be prepared by several known reaction routes, the preferred method of preparation for obtaining premium-quality coatings is by capping an isocyanate-functional prepolymer with an appropriate addition-polymerizable monomer having a single isocyanate-reactive active hydrogen group, with the reaction being effected in the presence of a diluent system which is inert with respect to the capping reaction but which is reactive with the unsaturated addition-polymerizable urethane resins at cure conditions. Among the more vexing of the problems associated with radiation curable compositions containing such polymerizable urethane resins, regardless of how the resin is prepared, are the high viscosity of the resin compositions which makes application by conventional industrial techniques extremely difficult, if not impossible; the difficulty of solvating the resinous compounds; physical instability of the compositions which is evidenced by thixotropy and/or cloudiness leading to eventual separation of the compositions into distinct resin-rich and monomer-rich phases; and an incompatibility between resinous and non-resinous components which is more evident with higher molecular weight components. Because the use of conventional inert solvents/diluents such as are employed with moisture-cure polyurethanes is undesirable, there have been developed the so-called reactive diluent systems, which generally comprise a mixture of monofunctional and polyfunctional unsaturated addition-polymerizable monomeric compounds which are copolymerizable with the unsaturated addition-polymerizable urethane resins and thus become part of the cured coating. However, these reactive diluent systems are not without problems. For example, certain of the lower molecular weight monomeric diluents are quite effective in affording clear coating compositions which can be applied by conventional industrial techniques; however, their use in diluent systems is often undesirable because of their relatively high volatility, even at the relatively low temperatures encountered during the curing cycle, which results in diluent loss, noxious fumes, increased atmospheric emissions, and a fogging above the work surface which interferes with energy transmission and adversely affects rate and degree of cure. These problems which are associated with the higher solvating low molecular weight monomer diluents can be largely overcome by employing as reactive monomer diluents acrylic and methacrylic acid esters containing at least six carbon atoms in the non-acid moiety of the molecule. While such acrylic and methacrylic acid esters are preferred because they do not present the volatility, noxious and curing problems associated with the lower molecular weight diluents, they are not without their problems. Generally, greater amounts of the acrylic and methacrylic acid esters having at least six carbon atoms in the non-acid moiety of the molecule are required for effective viscosity reduction. Because of their lower solvating power, the problems of physical instability and incompatibility of resin and diluent components are generally greater with diluent systems containing the less-volatile acrylic and methacrylic acid esters. Thus there remains a need to produce radiation curable compositions which will remain homogeneous, which can be readily and uniformly applied to substrates and which can be rapidly and fully cured to a dried film having the desired physical and chemical properties. It is equally important that harmful emissions to the atmosphere, noxiousness and other hazards be at least reduced, if not entirely eliminated.

During the course of extensive studies relating to the physical and chemical nature of radiation curable compositions, particularly such compositions containing unsaturated addition-polymerizable urethane resins, it was discovered that the composition of the resinous component markedly affects viscosity and physical stability of the compositions, as well as solubility and compatibility of the resinous components with respect to the reactive diluent system. More particularly, in accordance with the present invention, it has been discovered that unsaturated addition-polymerizable urethane resins having as characteristic features reduced viscosity, improved physical stability, and which are more readily soluble in or solvatable by and compatible with organic solvent/diluent systems can be obtained by employing as precursors at least one organic isocyanate compound having at least two isocyanate groups, at least one monomeric or polymeric polyol compound having at least two hydroxyl groups, and at least one unsaturated addition-polymerizable monomeric organic compound characterized by the presence of a single isocyanate-reactive active hydrogen group; provided that the amount of isocyanate compound is sufficient to afford an NCO:OH ratio, with respect to the polyol compound, of at least 2.1:1, preferable 2.3–4:1; and the average hydroxyl functionality of the polyol component is at least 2.1, preferably is in the range from 3.2 to 3.0, and most advantageously is in the range from about 2.3 to about 2.7. For brevity, unsaturated addition-polymerizable urethane resins will be referred to hereinafter in the disclosure and claims as unsaturated urethane resins. Radiation curable compositions containing the unsaturated urethane resins of the invention have an increased flowability and a substantially improved physical stability, can be readily and uniformly applied to metallic, fabric and plastic substrates by conventional industrial techniques, and rapidly cure upon exposure to a source of radiation to afford dried films having excellent properties. Unsaturated urethane resins prepared in accordance with this invention are readily solvated by and more compatible with acrylic and methacrylic acid esters having at least six carbon atoms in the non-acid moiety of the ester molecule, and permit the use of such low-volatility diluents at higher diluent levels than heretofore. The present invention further provides compositions having a more manageable viscosity at higher resin content than heretofore possible.

More particularly, in accordance with the present invention, there are provided unsaturated urethane resins comprising the reaction product of (i) at least one organic isocyanate compound having at least two isocyanate groups;

(ii) from about 30 to 100, preferably 70 to 100, mol percent of at least one polymeric polyol characterized by the presence of at least two hydroxyl groups;

(iii) from about 70 to zero, preferably about 30 to zero, mol percent of at least one monomeric polyol characterized by the presence of at least two hydroxyl groups; and (iv) at least one unsaturated addition-polymerizable monomeric compound having a single isocyanate-reactive active hydrogen group;

said isocyanate compound being present in an amount sufficient to provide an NCO:OH ratio of at least 2.1:1, preferably in the range of 2.3–4:1, with respect to such polymeric and monomeric polyol hydroxyl groups;

said mol percents being based on total mols of such polymeric and monomeric polyol hydroxyl groups;

the average hydroxyl functionality with respect to such monomeric and polymeric polyols is at least 2.1, preferably is in the range from about 2.2 to about 3.0, and advantageously is in the range from about 2.3 to about 2.7;

and wherein the amount of said unsaturated addition-polymerizable monomeric compound having a single isocyanate-reactive active hydrogen group is sufficient to provide at least one molar equivalent with respect to isocyanate reactivity, and is preferably sufficient to provide an active hydrogen group:NCO ratio of at least 1:1 with respect to total excess isocyanate functions present. The invention further provides radiation curable compositions comprising A. at least one unsaturated urethane resin prepared in accordance with this invention;

B. a reactive diluent system comprising at least one unsaturated addition-polymerizable monomeric compound which is copolymerizable with said unsaturated urethane resin, said diluent system preferably containing at least one unsaturated addition-polymerizable monofunctional monomeric compound selected from the group consisting of esters having the general formula

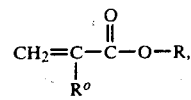

wherein $R^0$ is hydrogen or methyl and R is an aliphatic or cycloaliphatic, preferably alkyl or cycloalkyl, group having from 6 to 18, preferably 6 to 9, carbon atoms; and, optionally, C. an effective amount of at least one photoinitiator compound;

the amount of such unsaturated urethane resin being in the range from about 30 to about 90, preferably from about 50 to about 75, weight percent, based on total weight of such unsaturated urethane resin and such reactive diluent system. The photoinitiator compound, which will generally be employed when curing is effected with a low energy radiation source such as ultraviolet light radiation, will generally be in the range from about 0.01 to about 30, preferably about 0.1 to about 15, parts by weight per 100 parts by combined weight of unsaturated urethane resin and reactive diluent system.

Unsaturated urethane resins are well known in the art. Such resins comprise the reaction product of at least one organic isocyanate having at least two isocyanate groups, at least one monomeric or polymeric organic compound characterized by the presence of at least two isocyanate-reactive active hydrogen groups, and at least one unsaturated addition-polymerizable monomeric organic compound having a single isocyanate-reactive active hydrogen group, there being an excess of organic isocyanate compound with respect to said organic compounds containing at least two isocyanate-reactive active hydrogen groups. Unsaturated urethane resins can be prepared by several known reaction routes, with the method wherein an isocyanate-functional prepolymer, obtained by reacting an excess of organic isocyanate having at least two isocyanate groups with organic compounds having at least two active hydrogen groups, is reacted with an appropriate unsaturated addition-polymerizable monomeric compound having a single isocyanate-reactive active hydrogen group, such as 2-hydroxyethyl acrylate, being presently preferred. The various methods of preparing unsaturated urethane resins and prepolymer precursors are sufficiently well known as to require no further elaboration herein. The unsaturated urethane resins of this invention can be prepared by any of the known methods, with such resins prepared through the route of isocyanate-functional prepolymers being especially preferred.

Unsaturated urethane resins which are suitable for use in the practice of this invention have as a first characteristic feature, at least one, preferably at least two, polymerizable ethylenically unsaturated group(s) having the structure $>C=C<$. The polymerizable ethylenically unsaturated moiety is preferably a terminal vinyl group having the structure $CH_2=C<$. Especially preferred unsaturated urethane resins are the acrylyl urethane resins, i.e., unsaturated urethane resins containing a polymerizable acrylyl, methacrylyl, acrylamide, methacrylamide, and the like, moiety in the molecule, characterized by the presence of at least one, preferably at least two, terminal ethylenically unsaturated group(s) having the structure $CH_2=C<$.

The unsaturated urethane resins of the invention are further characterized in that they are obtained from organic polyisocyanate and organic polyol precursor compounds, as these compounds have been previously defined, at the NCO:OH ratios and hydroxyl functionalities previously set forth. It will be appreciated by the person skilled in the art that there must be employed a finite amount of at least one monomeric or polymeric organic polyol having at least three hydroxyl groups if the requirement of a hydroxyl functionality of at least 2.1 is to be satisfied. The invention thus encompasses mixtures of polyols, including mixtures of polyols having two hydroxyl groups and polyols having at least three hydroxyl groups.

The polyisocyanates which can be employed in forming the isocyanate-functional prepolymer can be any organic isocyanate having at least two free isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, tolylene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4',4"-triisocyanate, polymethylene polyphenylisocyanate, m-phenylene diisocyanate, p-phenylene diisocyanate, 2,6-tolylene diisocyanate, 1,5-naphthalene diisocyanate, naphthalene-1,4-diisocyanate, diphenylene-4,4'-diisocyanate 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate, 4,4'-methylene-bis(cyclohexyl isocyanate), 3,3'-dimethyldiphenylmethane-4,4'-diisocyanate, isophorone diisocyanate, the product obtained by reacting trimethylol propane and 2,4-tolylene diisocyanate in a molar ratio of 1:3, and the like.

Polyol compounds having at least two hydroxyl groups per molecule which are suitable for use in preparing the herein described unsaturated urethane resins comprise from about 30 to 100, preferably about 70 to 100, mol percent of at least one polymeric polyol and from about 70 to zero, preferably about 30 to zero mol percent of at least one monomeric polyol, including mixtures of such polyols. Polymeric and monomeric polyols are so well-known in the art that no need is seen to describe these materials in any detail. The polymeric polyhydroxy compounds can be dihydroxylated and polyhydroxylated polyethers and polyesters, including polyesters derived from caprolactone compounds, i.e., polycaprolactone polyols. The polyether and polyester polyols can be diols, triols, tetrols, and the like, with polyester polyols comprising the reaction product of (i) at least one glycol selected from the group consisting of 1,3-butylene glycol and neopentryl glycol;
(ii) adipic acid;
(iii) isophthalic acid; and
(iv) from about zero to about 50, preferably from about zero to about 30, mol percent of at least one aliphatic polyol having at least three hydroxyl groups, said mol percent being based on total mols of hydroxyl groups of glycol and polyol, the amount of isophthalic acid being in the range of from about 1 to about 50, preferably about 5 to about 20, mol percent, based on total mols of adipic acid and isophthalic acid, being especially preferred, with such polyester polyols having an average hydroxyl functionality of at least 2.1 being most advantageous. Similarly, the monomeric polyols which can replace up to about 70 mol percent of the polymeric polyol compounds can be diols, triols, tetrols and the like and include, without limitation thereto, compounds such as ethylene glycol, propylene glycol, diethylene glycol, glycerol, dipropylene glycol, erythritol, pentaerythritol, trimethylol propane, neopentyl glycol, and the like. Polyols employed in the practice of the invention will have molecular weights in the range from about 60 to about 4,000, with molecular weights in the range from about 500 to about 2,000 being presently preferred. The polymeric polyols and methods of preparing such compounds are well known in the art and require no further elaboration.

Unsaturated addition-polymerizable monomeric organic compounds having a single isocyanate-reactive active hydrogen group which can be employed in the practice of the present invention include any of such compounds which have been previously used to introduce an unsaturated polymerizable moiety into a molecule via reaction between the active hydrogen group and a reactive isocyanate moiety. Preferably, the active hydrogen group is hydroxy. Illustrative of unsaturated addition-polymerizable monomeric organic compounds having a single isocyanate-reactive active hydrogen group are 2-hydroxyethyl acrylate, 2-hydroxyethyl methacrylate, 2-hydroxypropyl acrylate, 2-hydroxypropyl methacrylate, N-hydroxymethyl acrylamide, N-hydroxymethyl methacrylamide, diethylene glycol monoacrylate, diethylene glycol monomethacrylate, glycerine dimethacrylate, trimethylol propane dimethacrylate, and the like. The amount of such compounds will be sufficient to provide at least one molar equivalent of active hydrogen group with respect to isocyanate functionality, and preferably is sufficient to afford an active hydrogen group: NCO ratio, with respect to the amount of total free hydroxyl functions, of at least 1:1, with a small excess, 10 mol percent or less, being especially preferred.

As has been indicated, the herein described unsaturated urethane resins are preferably obtained by reacting at least one isocyanate-functional prepolymer with at least one unsaturated addition-polymerizable monomeric organic compound having a single isocyanate-reactive active hydrogen group, with unsaturated urethane resins having substantially no free isocyanate functionality being especially preferred. Suitable prepolymers can be prepared according to known methods from the above listed precursors, keeping in mind the requirements for NCO:OH ratio and average hydroxyl functionality. Such prepolymers can be prepared neat, but are preferably prepared in the presence of a diluent phase which is copolymerizable with the unsaturated urethane resin but is inert with respect to the prepolymer reaction and the subsequent reaction between the prepolymer and the unsaturated addition-polymerizable monomeric organic compound having a single isocyanate-reactive active hydrogen group.

As noted, the radiation curable compositions of the present invention comprise a mixture of (i) at least one unsaturated urethane resin prepared in accordance with this invention;
(ii) a reactive diluent system comprising at least one unsaturated addition-polymerizable monomeric compound which is copolymerizable with said unsaturated urethane resin, and preferably containing at least one acrylic and/or methacrylic acid ester containing at least 6 carbon atoms in the non-acid moiety; and, optionally, (iii) an effective amount of at least one photoinitiator compound, within the compositional parameters previously set forth.

Reactive diluent systems which can be employed in the radiation curable compositions of this invention include any of such systems which have been or are being used for this purpose. Broadly, suitable reactive diluent systems comprise at least one unsaturated addition-polymerizable monomer which is copolymerizable with the unsaturated urethane resin upon exposure to radiation. The reactive diluent can be monofunctional or polyfunctional. A single polyfunctional diluent can be used, as can mixtures thereof; or a combination of one or more monofunctional reactive diluents and one or more polyfunctional reactive diluents can be used. Such combinations of mono- and polyfunctional reactive diluents are presently preferred. Generally, the reactive diluent system will comprise from about 10 to about 65, preferably about 25 to about 50, weight percent, based on total weight of unsaturated urethane resin and reactive diluent, of the radiation curable compositions of the invention. Particularly preferred reactive diluents are unsaturated addition-polymerizable monofunctional monomeric compounds selected from the group consisting of esters having the general formula

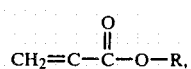

Wherein $R^o$ and R are as previously defined. Representative of such preferred reactive monomeric diluents, without limitation thereto, are hexyl acrylate, cyclohexyl acrylate, 2-ethylhexyl acrylate, octyl acrylate, nonyl acrylate, stearyl acrylate, and the corresponding methacrylates. Illustrative of other reactive monofunctional and polyfunctional monomeric diluents which can be employed are styrene, methyl methacrylate, butyl acrylate, isobutyl acrylate, 2-phenoxy acrylate, 2-methoxyethyl acrylate, 2-(N,N-diethylamino)ethyl acrylate, the corresponding methacrylates, acrylonitrile, methyl acrylonitrile, methacrylamide, neopentyl glycol diacrylate, ethylene glycol diacrylate, hexylene glycol diacrylate, diethylene glycol diacrylate, trimethylol propane triacrylate, pentaerythritol di-, tri-, or tetra-acrylate, the corresponding methacrylates, vinyl pyrrolidone, and the like. At the present time, it is preferred that the reactive diluent system contain at least 50 weight percent of at least one acrylic and/or methacrylic acid ester having at least 6 carbon atoms in the non-acid moiety, with such acrylic acid esters being preferred. Generally, the reactive diluent system will comprise from about 10 to about 70, preferably about 25 to about 50, weight percent, based on total weight of unsaturated urethane resin and reactive diluent system, of the radiation curable compositions of the invention. Reactive diluent systems are well known to those skilled in the art of radiation curing and the selection of an appropriate diluent system in any given instance is sufficiently encompassed by such knowledge as to require no further discussion here.

As previously indicated, a photoinitiator system will generally be employed when curing is effected by exposure to low energy radiation sources such as ultra violet light. Any of the known photoinitiators can be used within the concentration ranges previously set forth. Illustrative photoinitiators, without limitation thereto, include benzophenone, benzoin, acetophenone, benzoin methyl ether, Michler's ketone, benzoin butyl ether, xanthone, thioxanthone, propiophenone, fluorenone, carbazole, diethoxyacetophenone, the 2-, 3- and 4-methylacetophenones and methoxyacetophenones, the 2- and 3-chloroxanthones and chlorothioxanthones, 2-acetyl-4-methylphenyl acetate, 2,2'-dimethoxy-2-phenylacetophenone, benzaldehyde, fluorene, anthroquinone, triphenylamine, 3- and 4-allylacetophenone, p-diacetylbenzene, 3-chloro-2-nonylxanthone, and the like, and mixtures thereof.

The invention compositions can also include pigments, fillers, wetting agents, flatting agents, flow control agents, and other additives typically present in coating compositions. In some applications, the inclusion of minor amounts of inert solvents can be advantageous. Such additive materials are well known to those skilled in the art and do not require further elaboration herein. Also well known are the concentrations at which such additives are used.

The radiation curable compositions of this invention are characterized by improved flowability, fluidity and physical stability. The compositions of this invention can be applied to wood, metal, fabric and plastic substrates in an economical and efficient manner using conventional industrial techniques and provide smooth, uniform films which are rapidly cured to dried films having excellent physical and chemical properties.

The improved coating compositions of this invention can be applied and cured by any of the conventional known methods. Application can be by roll coating, curtain coating, airless spray, dipping or by any other procedure. The cure can be effected by exposure to any high energy source, such as ionizing radiation, or low energy source, such as ultraviolet light radiation. The equipment utilized for curing, as well as the appropriate time for curing, and the conditions under which the curing is effected are well-known to those skilled in the art of radiation curing and do not require further elaboration herein.

The invention is illustrated in greater detail by the following Examples, but these examples are not to be construed as limiting the present invention. All parts, percentages and the like are in parts by weight, unless otherwise indicated.

EXAMPLE 1

Several unsaturated urethane resins are prepared in 2-ethylhexyl acrylate reactive monomer diluent at a resin concentration of 70 percent employing as precursor compounds polyester polyols, 4,4'-methylene-Bis(-Cyclohexyl isocyanate), and 2-hydroxyethyl acrylate. In each instance the polyester polyol is reacted with the isocyanate compound at NCO:OH ratios of 1.5:1, 2:1, 2.5:1, 3:1 and 3.5"1 to form an isocyanate-functional prepolymer; and the prepolymer is reacted with 2-hydroxyethyl acrylate to form an ethylenically unsaturated acrylyl urethane having at least two terminal vinyl groups and substantially no free isocyanate functions. The polyester polyols have hydroxyl functionalities f(oh) of 2.0, 2.3, 2.5, 2.7 and 3.0. The resins are evaluated with respect to viscosity at 70% resin concentration, physical stability and compatibility in 2-ethylhexyl acrylate reactive monomer diluent. The results are reported in Table I, with the unsaturated urethane resin being identified in relation to the polyester polyol from which it is made.

TABLE I

| Resin | Polyester Polyol | f (CH) | NCO:CH | Viscosity CPS | Physical Stability[a] | Compatibility[b] |
|---|---|---|---|---|---|---|
| 1 | A | 2.0 | 1.5 | 90,000 | P | 5 |
| 2 | A | 2.0 | 2.0 | 30,000 | F | 4 |
| 3 | A | 2.0 | 2.5 | 6,400 | F | 3 |
| 4 | A | 2.0 | 3.0 | 6,600 | G | 2 |
| 5 | A | 2.0 | 3.5 | 4,500 | G | 1 |
| 6 | B | 2.3 | 1.5 | 100,000 | P | 5 |
| 7 | B | 2.3 | 2.0 | 44,000 | F | 3 |
| 8 | B | 2.3 | 2.5 | 22,000 | E | S |
| 9 | B | 2.3 | 3.0 | 10,000 | E | S |
| 10 | B | 2.3 | 3.5 | 5,600 | E | S |
| 11 | B | 2.5 | 1.5 | GEL | | |
| 12 | B | 2.5 | 2.0 | 66,000 | F | 3 |
| 13 | B | 2.5 | 2.5 | 24,500 | E | S |
| 14 | B | 2.5 | 3.0 | 12,500 | E | S |
| 15 | B | 2.5 | 3.5 | 10,000 | E | S |
| 16 | B | 2.7 | 1.5 | GEL | | |
| 17 | B | 2.7 | 2.0 | 75,000 | F | 4 |
| 18 | B | 2.7 | 2.5 | 47,000 | G | 1 |
| 19 | B | 2.7 | 3.0 | 20,000 | E | S |
| 20 | B | 2.7 | 3.5 | 13,000 | E | S |
| 21 | B | 3.0 | 1.5 | GEL | | |
| 22 | B | 3.0 | 2.0 | GEL | | |
| 23 | B | 3.0 | 2.5 | 60,000 | F | 3 |
| 24 | B | 3.0 | 3.0 | 35,000 | G | 2 |
| 25 | B | 3.0 | 3.5 | 17,000 | E | S |
| 26 | C | 3.0 | 1.5 | GEL | | |
| 27 | C | 3.0 | 2.0 | 100,000 | G | 2 |
| 28 | C | 3.0 | 2.5 | 22,000 | E | S |
| 29 | C | 3.0 | 3.0 | 10,000 | E | S |

A: 1,3-Butylene Glycol/Adipic Acid (90)/Isophthalic Acid (10) Polyester Polyol
B: 1,3-Butylene Glycol/Adipic Acid (90)/Isophthalic Acid (10)/Glycerine Polyester Polyol
C: Polycaprolactone triol polyester polyol
[a] P: Poor, F = Fair, G = Good E = Excellent
[b] Compatibility increases as cardinal number decreases, e.g., 3 is more compatible than 5 but less compatible than 1, S is soluble and fully compatible.

The data demonstrate the significant viscosity reductions which are obtained at NCO:OH ratios in excess of 21:1. For example, an increase in NCO:OH ratio from 2:1 to 2.5:1 results in an approximate two-fold decrease in viscosity; a further increase in NCO:OH ratio from 2.5:1 to 3:1 results in another two-fold decrease in viscosity; and even lower viscosities are obtained at an NCO:OH ratio of 3.5:1. It is to be noted that viscosity tends to increase, at constant NCO:OH ratio, with increasing hydroxyl functionality and that viscosity decreases, at constant hydroxyl functionality, with increasing NCO:OH ratio. It is also to be noted that resin-diluent compatibility and physical stability of the compositions containing unsaturated urethane resins become increasingly better as the NCO:OH ratio increases at constant hydroxyl functionality. It is further noted that excellent compositions with respect to manageable viscosity, physical stability and resin-diluent compatibility can be consistently obtained at NCO:OH ratios of about 2.3:1 to 4:1 and higher, at any substantially all hydroxy functionalities in the range between about 2.3 to about 2.7. The data demonstrate that at NCO:OH ratios below about 2.3:1 and at hydroxy functionalities below about 2.3 and above about 2.7, some experimentation may be necessary in obtaining compositions having the desired characteristics.

EXAMPLE II

To a composition containing 70 percent Resin 8 (hydroxy functionality 2.3 and NCO:OH ratio 2.5) in 2-ethylhexyl acrylate reactive monomer diluent, there is added the adduct of 2 moles 2-hydroxyethyl acrylate and 4,4'-methylene-bis (cyclohexyl isocyanate) in an amount sufficient to simulate an NCO:OH ratio of 3:1. No significant change in viscosity, physical stability or compatibility is noted, thus demonstrating that the benefits of this invention can only be attained by synthesizing the unsaturated urethane resins in accordance with the concepts of the invention.

EXAMPLE III

Several formulations are prepared employing selected unsaturated urethane resins from Example I as follows:

| Composition | A | B | C | D | E | F |
|---|---|---|---|---|---|---|
| Resin 9 | 70 | — | — | — | — | — |
| Resin 14 | — | 70 | — | — | — | — |
| Resin 19 | — | — | 70 | — | — | — |
| Resin 20 | — | — | — | 70 | — | — |
| Resin 25 | — | — | — | — | 70 | — |
| Resin 29 | — | — | — | — | — | 70 |
| 2-Ethylhexyl Acrylate | 30 | 30 | 30 | 30 | 30 | 30 |
| Benzoin Ether-type Photoinitiator | 1 | 1 | 1 | 1 | 1 | 1 |
| Viscosity, CPS, Thousands | 10 | 12.5 | 20 | 13 | 17 | 10 |

The compositions are coated onto aluminum substrates and cured by exposure to ultraviolet radiation (200 watts/inch mercury lamp) at a line speed of 50 feet per minute for three passes. The compositions are easily applied and cure to dried smooth, uniform films which are tough and flexible and have excellent chemical and physical properties.

What is claimed is:

1. Unsaturated addition-polymerizable urethane resins characterized by the presence of at least one ethylenically unsaturated group having the structure

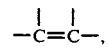

said unsaturated urethane resins consisting essentially of the reaction product of
  (i) at least one organic isocyanate compound having at least two isocyanate groups;
  (ii) from about 30 to 100 mol percent of at least one polymeric polyol characterized by the presence of at least two hydroxyl groups;
  (iii) from about 70 to zero mol percent of at least one monomeric polyol characterized by the presence of at least two hydroxyl groups; and
  (iv) at least one unsaturated addition-polymerizable monomeric compound having a single isocyanate-reactive active hydrogen group; wherein
said isocyanate compound being present in an amount sufficient to provide an NCO:OH ratio of at least 2.5:1, with respect to such polymeric and monomeric polyol hydroxyl groups;
said mol percents being based on total mols of such polymeric and monomeric polyol hydroxyl groups;
the average hydroxyl functionality, with respect to such polymeric and monomeric polyols, is at least 2.1, and
the amount of said unsaturated addition-polymerizable monomeric compound having a single isocyanate-reactive active hydrogen group is sufficient to provide at least one molar equivalent of active hydrogen group with respect to isocyanate reactivity.

2. Unsaturated urethane resins according to claim 1 comprising the reaction product of
(i) at least one isocyanate-functional prepolymer, said prepolymer comprising the reaction product of
(a) at least one organic isocyanate compound having at least two isocyanate groups;
(b) from about 30 to 100 mol percent of at least one polymeric polyol characterized by the presence of at least two hydroxyl groups;
(c) from about 70 to zero mol percent of at least one monomeric polyol characterized by the presence of at least two hydroxyl groups; and
(ii) at least one unsaturated addition-polymerizable monomeric compound having a single isocyanate-reactive active hydrogen group.

3. Unsaturated urethane resins according to claim 1 wherein said hydroxyl functionality is in the range from about 2.2 to about 3.

4. Unsaturated urethane resins according to claim 1 wherein said NCO:OH ratio is in the range of 2.5–4:1 and said hydroxyl functionality is in the range from about 2.3 to about 2.7.

5. Unsaturated urethane resins according to claim 1 wherein said ethylenically unsaturated group is a terminal vinyl group having the structure $CH_2=C<$.

6. Unsaturated urethane resins according to claim 5 wherein said NCO:OH ratio is in the range from about 2.5:1 to about 4:1.

7. Unsaturated urethane resins according to claim 6 wherein said hydroxyl functionality is in the range from about 2.2 to about 3.

8. Unsaturated urethane resins according to claim 6 wherein said NCO:OH ratio is in the range of 2.5:1 and said hydroxyl functionality is in the range from about 2.3 to about 2.7.

9. Unsaturated urethane resins according to claim 6 wherein said polymeric polyol comprises the reaction product of
(i) at least one glycol selected from the group consisting of 1.3-butylene glycol and neopentyl glycol;
(ii) adipic acid;
(iii) isophthalic acid; and
(iv) from zero to about 50 mol percent of at least one aliphatic polyol having at least three hydroxyl groups, said mol percent being based on total mols of hydroxyl groups of such glycol and such aliphatic polyol;
the amount of isophthalic acid being in the range from about 1 to about 50 mol percent, based on total mols of adipic acid and isophthalic acid.

10. Unsaturated urethane resins according to claim 6 comprising the reaction product of
(i) at least one isocyanate-functional prepolymer, said prepolymer comprising the reaction product of
(a) at least one organic isocyanage compound having at least two isocyanate groups;
(b) from about 30 to 100 mol percent of at least one polymeric polyol characterized by the presence of at least two hydroxyl groups;
(c) from about 70 to zero mol percent of at least one monomeric polyol characterized by the presence of at least two hydroxyl groups; and
(ii) at least one unsaturated addition-polymerizable monomeric compound having a single isocyanate-reactive active hydrogen group.

11. Unsaturated urethane resins according to claim 10 wherein the amount of such unsaturated addition-polymerizable monomeric compound having a single isocyanate-reactive active hydrogen group is sufficient to provide an active hydrogen group: NCO ratio of at least 1:1.

12. Unsaturated urethane resins according to claim 11 wherein said NCO:OH ratio is in the range from about 2.5:1 to about 4:1.

13. Unsaturated urethane resins according to claim 11 wherein said hydroxyl functionality is in the range from about 2.2 to about 3.

14. Unsaturated urethane resins according to claim 11 wherein said NCO:OH ratio is in the range from about 2.5:1 to about 4:1 and said hydroxyl functionality is in the range from about 2.3 to about 2.7.

15. A coating composition comprising
A. at least one unsaturated resin consisting essentially of the reaction product of
(i) at least one organic isocyanate compound having at least two isocyanate groups;
(ii) from about 30 to 100 mol percent of at least one polymeric polyol characterized by the presence of at least two hydroxyl groups;
(iii) from about 70 to zero mol percent of at least one monomeric polyol characterized by the presence of at least two hydroxyl groups; and
(iv) at least one unsaturated addition-polymerizable monomeric compound having a single isocyanate-reactive active hydrogen group; wherein
said isocyanate compound being present in an amount sufficient to provide an NCO:OH ratio of at least 2.5:1, with respect to such polymeric and monomeric polyol hydroxyl groups;
said mol percents being based on total mols of such polymeric and monomeric polyol hydroxyl groups;
the average hydroxyl functionality, with respect to such polymeric and polymeric polyols, is at least 2.1, and
the amount of said unsaturated addition-polymerizable monomeric compound having a single isocyanate-reactive active hydrogen group is sufficient to provide at least one molar equivalent of active hydrogen group with respect to isocyanate reactivity; and
B. A reactive diluent system comprising at least one unsaturated addition-polymerizable monomeric compound which is copolymerizable with said unsaturated urethane resin;
the amount of unsaturated urethane resin being in the range from about 30 to about 90 weight percent, based on total weight of unsaturated urethane resin and reactive diluent system.

16. A coating composition according to claim 15 wherein said diluent system contains at least one unsaturated addition-polymerizable monofunctional monomeric compound selected from the group consisting of esters having the general formula $$CH_2=C-\underset{R^o}{\overset{\overset{O}{\|}}{C}}-O-R;$$

wherein $R^o$ is hydrogen or methyl and R is an aliphatic or cycloaliphatic group having from 6 to 18 carbon atoms.

17. A composition according to claim 15 wherein said unsaturated urethane resin comprises the reaction product of
(i) at least one isocyanate-functional prepolymer, said prepolymer comprising the reaction product of
  (a) at least one organic isocyanate compound having at least two isocyanate groups;
  (b) from about 30 to 100 mol percent of at least one polymeric polyol characterized by the presence of at least two hydroxyl groups;
  (c) from about 70 to zero mol percent of at least one monomeric polyol characterized by the presence of at least two hydroxyl groups; and
(ii) at least one unsaturated addition-polymerizable monomeric compound having a single isocyanate-reactive active hydrogen group.

18. A coating composition according to claim 15 wherein said NCO:OH ratio is in the range from about 2.5:1 to about 4:1.

19. A coating composition according to claim 15 wherein said hydroxyl functionality is in the range from about 2.2 to about 3.

20. A coating composition according to claim 15 wherein said NCO:OH ratio is in the range of about 2.5:1 to about 4:1 and said hydroxyl functionality is in the range from about 2.3 to about 2.7.

21. A coating composition according to claim 15 containing an effective amount of at least one photoinitiator compound.

22. A coating composition according to claim 21 wherein said NCO:OH ratio is in the range from about 2.5:1 to about 4:1.

23. A coating composition according to claim 21 wherein said hydroxyl functionality is in the range from about 2.2 to about 3.

24. A coating composition according to claim 21 wherein said NCO:OH ratio is in the range from about 2.5:1 to about 4:1 and said hydroxyl functionality is in the range from about 2.3 to about 2.7.

25. A coating composition according to claim 21 wherein said unsaturated urethane resin comprises the reaction product of
(i) at least one isocyanate-functional prepolymer, said prepolymer comprising the reaction product of
  (a) at least one organic isocyanate compound having at least two isocyanate groups;
  (b) from about 30 to 100 mol percent of at least one polymeric polyol characterized by the presence of at least two hydroxyl groups;
  (c) from about 70 to zero mol percent of at least one monomeric polyol characterized by the presence of at least two hydroxyl groups; and
(ii) at least one unsaturated addition-polymerizable monomeric compound having a single isocyanate-reactive active hydrogen group.

26. A coating composition according to claim 25 wherein the amount of such unsaturated addition-polymerizable monomeric compound having a single isocyanate-reactive active hydrogen group is sufficient to provide an active hydrogen group: NCO ratio of at least 1:1.

27. Coating compositions according to claim 26 wherein said NCO:OH ratio is in the range from about 2.5:1 to about 4:1.

28. Coating compositions according to claim 26 wherein said hydroxyl functionality is in the range from about 2.2 to about 3.

29. Coating compositions according to claim 26 wherein said NCO:OH ratio is in the range from about 2.5:1 to about 4:1 and said hydroxyl functionality is in the range from about 2.3 to about 2.7.

30. Coating compositions according to claim 26 wherein said diluent system contains at least one unsaturated addition-polymerizable monofunctional monomeric compound selected from the group consisting of esters having the general formula

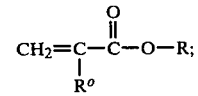

wherein R° is hydrogen or methyl and R is an aliphatic or cycloaliphatic group having from 6 to 18 carbon atoms.

31. Coating compositions according to claim 30 wherein aid NCO:OH ratio is in the range from about 2.5:1 to about 4:1.

32. Coating compositions according to claim 30 wherein said hydroxyl functionality is in the range from about 2.2 to about 3.

33. Coating compositions according to claim 30 wherein said NCO:OH ratio is in the range from about 2.5:1 to about 4:1 and said hydroxyl functionality is in the range from about 2.3 to about 2.7.

* * * * *